Patented July 22, 1952

2,604,469

UNITED STATES PATENT OFFICE 2,604,469

DUSTPROOFED ORGANIC COLOR COMPOUNDS

Albert E. Herrmann, Jr., East Greenbush, N. Y., assignor to General Aniline & Film Corporation, New York, N. Y., a corporation of Delaware No Drawing. Application December 30, 1947, Serial No. 794,781

12 Claims. (Cl. 260—141)

This invention relates to a process of dustproofing powdered organic color materials and to the thus-obtained dustless powder compositions.

Many organic color materials, such as dyestuffs, organic pigments and the like are produced in a finely-powdered form. However, such finely-powdered material is subject to dusting which, while in some cases is sufficiently slight so as to be negligible, not infrequently is so pronounced that the packaging, pouring and measuring of the material is difficult. In addition, in certain extreme cases of dusting, the dust which is raised in handling and processing finely-powdered material may also constitute a health hazard which may cause respiratory troubles, skin irritations or even poisoning among the workers, depending on the particular material being handled, and may also cause substantial spoilage and damage to other materials being processed in the vicinity. In fact, in the case of many vat colors and their leuco esters, dusting has been such a problem that they are manufactured in a grain form rather than as a finely-divided powder, chiefly to overcome the dusting problem, although their preparation in grain form adds considerably to the cost of manufacture; while in other cases of pronounced dusting the material is frequently handled in a wet form rather than as a dry powder, although for many applications the dry powder would be preferred.

Numerous efforts have been made to solve this problem by the addition of various dustproofing agents to the powdered material. The usual materials which have been employed as dustproofing agents are humectant substances, hydrocarbon oils or even water. Thus, the material which gives rise to dust may be wet down or moistened prior to, during or after pulverization with such dust-controlling agents as kerosene or other light petroleum fractions such as light lubricating oils or with humectant substances, such as glycerine, ethylene glycol, non-crystallizing sugar solutions or the like, or may be simply wet with water. The particular dustproofing agent which has been employed has, of course, varied with the specific material which it is desired to dustproof and in general, the additive which is employed for dustproofing is one which is inert and does not react with the powdered material. Thus, where water reacts with or is detrimental to the material to be dustproofed, it is obvious that various humectant substances should not be employed. However, even where an inert liquid has been available, the particular liquids which have heretofore been employed as dustproofing additives have failed to show fully satisfactory results, since in many instances where they did not have too great reactivity with the material to be dustproofed, they did cause caking of the material, lost their effectiveness on storage, caused discoloration of the product which was dustproofed or they tended to neutralize or destroy desirable properties in the dustproofed material.

I have now found that stable silicone fluids (i. e. the group of organo-silicon oxide polymers having a Si—O—Si linkage and having hydrocarbon radicals connected to the silicon atoms with a C—Si linkage and which are stable liquids) are valuable additives for the dustproofing of powdered organic color materials of all types. These silicone fluids possess a great many properties which make them substantially ideal as dustproofing additives for such powdered organic color materials, since they are quite inert chemically and thus do not react with the materials to which they are added. They are also very poor solvents and thus no noticeable solvent action on the powdered materials is exerted. They do not interfere with the use of the powdered compositions; they have no odor; they are non-toxic, and they impart a permanent non-dusting effect. In addition, they have no tendency to cause caking of the powdered material to which they are added, and it remains a free-flowing powder which is, however, free of any dust.

The organic color materials which in powder form may advantageously be dustproofed in accordance with the present invention include not only the usual dyestuffs, such as vat and azo dyes and also the organic pigments, but also such color materials as chromogens and auxochromic compounds. Under the term "chromogen" is included those organic compounds which, while in themselves not dyestuffs, are capable of being converted to dyestuffs by an agency such as oxidation or by coupling with a compound containing one or more auxochromic groups (i. e. auxochromic compounds). Under the term "chromogen" there are included leuco vat dyestuffs and their derivatives, such as the leuco sulfuric acid esters, which on oxidation are converted to the vat dyestuffs, and the water-soluble stabilized diazo compounds which in aqueous medium (acid, neutral or alkaline as the case may be) couple with auxochromic compounds. It has been found that the process of the present invention is especially useful and particularly valuable products are obtained when it is applied to the class of chromogen compounds known as "fast color salts"; i. e. diazonium compounds which are stabilized with metal salts such as zinc chloride, cadmium chloride, tin chloride and the like; alkyl or preferably aryl sulfonic acids, e. g. chlorobenzene-sulfonic acids; acetyl aminobenzene-sulfonic acids; and naphthalene di- and tri-sulfonic acids; acid sulfates and in a few instances, chlorides. The term "auxochromic compound" is used herein in the customary sense of the term to mean those organic compounds which contain one or more auxochromes, which principally are hydroxy, amino and substituted amino groups. Compounds of this type are, for example, resorcinol, salicyclic acid, β-naphthol, β-naphthol-3,6-disulfonic acid (sodium salt), dehydrothio-p-toluidine, β-naphthylamine, β-naphthylamine-3,6-disulfonic acid and the like. The class of auxochromic compounds with which the present invention is particularly concerned are those known in the art as Naphthol-AS compounds (i. e. arylides of carboxylic acids which are capable of coupling with the diazo compound to form an azo dyestuff). Examples of this type of coupler compounds are the anilides or anisidides of 2,3-hydroxy-naphthoic acid, 2,3-hydroxy-anthroic acid, 2-hydroxy-11-benzo(a)-carbazole-3-carboxylic acid, 2-hydroxy-3-dibenzofurancarboxylic acid, and the like, and bis acetoacetyl benzidides, terephthaloyl-γ,γ'-diacetic acid esters or arylides and the like.

I have found that the organic color compounds of the type specified above are readily dustproofed by thoroughly mixing them with from as little as 0.5% by weight of silicone fluid to 5% or more (i. e. up to 10% by weight) of silicone fluid, preferably from about 1% to 3% by weight of silicone fluid. It has been found that as little as 0.5% silicone fluid gives positive dustproofing results with very finely-powdered materials and in most cases further improvement in dustproofing is not noticed when more than about 3% of silicone fluid is used, although slightly larger amounts may be employed, if desired, without adverse effect (i. e. liquid separation by drainage). However, from a practical standpoint, there appears to be no advantage in using such larger amounts. The mixing may take place either before or after the organic color compound is pulverized and it may be effected by any suitable means, such as thorough mechanical mixing, spraying or the like. Advantageously, the mixing may be effected by adding the silicone fluid to a powdered organic color compound in a powder-blending machine having means for spraying or otherwise uniformly distributing the liquid over the powder.

A wide variety of silicones are well known in the art and the term "silicone" as employed in both the art and this specification is intended to cover those organo-silicon polymers which comprise essentially silicon atoms connected to each other by oxygen atoms through silicon-oxygen linkages and with organic radicals attached through carbon-silicon linkages to the silicone atoms. The unit of structure of silicones may be represented by the following formula:

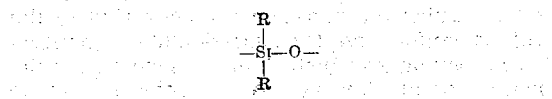

in which the R's stand for organic radicals.

These silicones are commonly prepared by hydrolysis of hydrolyzable organo-silanes such as chloro, amino, alkyloxy, aryloxy and acyloxy organo-silanes, and condensation of the hydrolysis products. Depending on the particular conditions of hydrolysis and condensation and the specific hydrolyzable organo-silane employed, the product obtained may be an oil, resin or elastomer or a complex mixture of these three. I have found that the silicones which are stable liquids at ordinary temperatures are satisfactory for use as dustproofing agents in accordance with the present invention. Such stable silicone liquids and their preparation have heretofore been described, for example, in U. S. Patents Nos. 2,384,384 and 2,398,187, and as examples of specific silicones which may be obtained in the form of stable liquids suitable for use as dustproofing agents in accordance with the present invention may be mentioned dimethyl silicone and other lower alkyl silicones such as ethyl-, propyl-, butyl- and amyl-silicone and also some cyclohexyl- or benzyl-silicones which are stable liquids. The aryl silicones, however, do not form liquid polymers and therefore are not satisfactory dustproofing agents. While silicone liquids having a wide range of viscosities (i. e. from 1 centistoke up to over 100,000 centistokes) have been described in the literature, I have found that the best results in dustproofing are obtained when low viscosity stable silicone liquids are employed as dustproofing agents, and particularly prefer those stable silicone liquids having a viscosity at 25° C. of from 1 centistoke to 1,000 centistokes.

The following specific examples fully illustrate the present invention for those skilled in the art:

*Example 1*

100 g. of the zinc chloride double salt of diazotized 5-nitro-o-anisidine are mixed well in a mortar with 2 g. silicone fluid having a viscosity at 25° C. of 1 centistoke. The resulting mixture is a free-flowing dustless power with very good storage stability.

*Example 2*

100 g. of the zinc chloride double salt of diazotized 2,5-dichloroaniline are mixed well in a mortar with 2 g. silicone fluid having a viscosity at 25° C. of 1,000 centistokes. The resulting mixture is a free-flowing dustless power with good storage stability.

*Example 3*

100 g. of an azoic dye mixture comprising Naphthol AS-G (bis acetoacet-tolidide) and a diazoimino derivative of 5-chloro-o-anisidine are mixed well in a mortar with 2 g. silicon fluid having a viscosity at 25° C. of 10 centistokes. The resulting mixture is a free-flowing dustless powder and has good wetting-out properties.

*Example 4*

100 g. of 4-nitro-p-anisidine, diazotized and stabilized with an aryl sulfonic acid, are mixed well in a mortar with 1 g. silicone fluid having a viscosity at 25° C. of 10 centistokes. The resulting product is free-flowing dustless powder.

*Example 5*

100 g. of 5-nitro-o-anisidine, diazotized and stabilized with an arylamine, are mixed well in a mortar with 5 g. silicone fluid having a viscosity at 25° C. of 10 centistokes. The resulting product is a free-flowing dustless powder and has excellent wetting properties.

*Example 6*

100 g. of the azo dyestuff prepared from diazotized p-nitro-aniline and dihydroxyethyl-m- toluidine are mixed well in a mortar with 2 g. silicone fluid having a viscosity at 25° C. of 1 centistoke. The resulting product is a free-flowing dustless powder.

I claim:

1. A dustless composition in the form of a free-flowing powder comprising a solid, normally-dusting powdered organic color compound admixed with an amount of a silicone liquid stable to polymerization and having the following structural formula:

in which the R's stand for organic radicals, said amount of said silicone liquid being at least 0.5% by weight of said composition and not above the quantity which would result in liquid separation by drainage.

2. A dustless composition in the form of a free-flowing powder comprising a solid, normally-dusting powdered organic color compound admixed with an amount of a silicone liquid stable to polymerization having the following structural formula:

in which the R's stand for hydrocarbon radicals, said amount of said silicone liquid being at least 0.5% by weight of said composition and not above the quantity which would result in liquid separation by drainage.

3. A dustless diazo composition in the form of a free-flowing powder comprising a normally-dusting powdered diazo compound admixed with an amount of a silicone liquid stable to polymerization having the following structural formula:

in which the R's stand for organic radicals, said amount of said silicon liquid being at least 0.5% by weight of said composition and not above the quantity which would result in liquid separation by drainage.

4. A dustless diazo composition in the form of a free-flowing powder comprising a normally-dusting powdered diazo compound admixed with an amount of a silicone liquid stable to polymerization having the following structural formula:

in which the R's stand for hydrocarbon radicals, said amount of said silicone liquid being at least 0.5% by weight of said composition and not above the quantity which would result in liquid separation by drainage.

5. A dustless composition in the form of a free-flowing powder comprising a solid, normally-dusting powdered organic color compound consisting essentially of a fast color salt admixed with an amount of a silicone liquid stable to polymerization having the following structural formula:

in which the R's stand for alkyd radicals, having a viscosity at 25° C. within the range of 1–1000 centistokes, said amount being at least 0.5% by weight of said composition and not above the quantity which would result in liquid separation by drainage.

6. A composition as defined in claim 2, wherein the silicone liquid has a viscosity at 25° C. within the range of 1 to 1,000 centistokes.

7. A composition as defined in claim 2, wherein the silicone liquid is a liquid polymeric dimethyl silicone having a viscosity within the range of 1 to 1,000 centistokes at 25° C.

8. A composition as defined in claim 4, wherein the silicone liquid has a viscosity at 25° C. within the range of 1 to 1,000 centistokes.

9. A composition as defined in claim 4, wherein the silicone liquid is polymeric dimethyl silicone, having a viscosity at 25° C. within the range of 1 to 1,000 centistokes.

10. A composition as defined in claim 1, wherein said normally dusting powdered organic color compound is a fast color salt.

11. A composition as defined in claim 2, wherein said normally dusting powdered organic color compound is a fast color salt.

12. A composition as defined in claim 5 wherein the silicone liquid specified is a liquid polymeric dimethyl silicone.

ALBERT E. HERRMANN, Jr.

REFERENCES CITED

The following references are of record in the file of this patent:

UNITED STATES PATENTS

| Number | Name | Date |
| --- | --- | --- |
| 2,234,484 | Weinig | Mar. 11, 1941 |
| 2,390,406 | Wegst | Dec. 4, 1945 |

FOREIGN PATENTS

| Number | Country | Date |
| --- | --- | --- |
| 471,243 | France | July 6, 1914 |
| 576,100 | Great Britain | 1943 |

OTHER REFERENCES

Saunders "The Aromatic Diazo Compounds," page 70.

"Organosilicon Polymers," article by E. G. Rochow, pages 612–616 of Chem. and Eng. News for April 10, 1945.